US005845824A

United States Patent [19]
Weimer et al.

[11] Patent Number: 5,845,824
[45] Date of Patent: Dec. 8, 1998

[54] BEVERAGE DISPENSER WITH ELECTRICALLY CONTROLLED CLUTCH

[75] Inventors: Michael G. Weimer, Oconomowoc; David K. Wetzel, Watertown; Jeffrey Hale, Hartland; Scott W. Braun, Watertown, all of Wis.

[73] Assignee: Eaton Corporation, Cleveland, Ohio

[21] Appl. No.: 812,462

[22] Filed: Mar. 6, 1997

[51] Int. Cl.[6] .............. G01C 4/12

[52] U.S. Cl. .............. 222/641; 222/509; 137/624.12; 251/89

[58] Field of Search .............. 222/14, 639, 640, 222/641, 129.1, 129.2, 129.3, 129.4, 504, 505, 509; 137/624.12; 251/89, 245, 246

[56] References Cited

U.S. PATENT DOCUMENTS

| | | | |
|---|---|---|---|
| 1,799,113 | 3/1931 | Meidbrodt | 137/624.12 X |
| 2,765,058 | 10/1956 | Struthers | 251/89 X |
| 3,409,175 | 11/1968 | Byrne | 222/641 |
| 3,812,890 | 5/1974 | Haas et al. | 141/94 |
| 4,572,405 | 2/1986 | Miura | 222/14 |
| 4,736,875 | 4/1988 | King | 222/641 |
| 4,905,743 | 3/1990 | Gray | 141/198 |
| 5,040,106 | 8/1991 | Maag | 364/167 |
| 5,431,302 | 7/1995 | Tulley et al. | 222/14 |
| 5,454,406 | 10/1995 | Rejret et al. | 141/1 |

*Primary Examiner*—Gregory L. Huson
*Attorney, Agent, or Firm*—Quarles & Brady

[57] ABSTRACT

A beverage dispenser includes a body having a bore with an inlet, an outlet and a valve seat therebetween. A valve stem has a seal to selectively engage the valve seat to open and close the bore to a flow of beverage between the inlet and outlet. A serving lever is pivotally connected to the body and selectively coupled and decoupled to the valve stem by a clutch which is operated by a solenoid. Operating the serving lever may move the seal away from the valve seat only when clutch couples the serving lever to the valve stem. A control circuit operates the solenoid to cause the clutch to decouple the serving lever from the valve stem when the beverage has been dispensed continuously for greater than a defined period of time.

16 Claims, 2 Drawing Sheets

BEVERAGE DISPENSER WITH ELECTRICALLY CONTROLLED CLUTCH

BACKGROUND OF THE INVENTION

The present invention relates to equipment for dispensing a beverage into a serving container; and more particularly to taps which automatically control the amount of beverage that flows into each serving container.

Restaurants and taverns frequently dispense beverages, such as soft drinks and beer, from a tap. Conventional taps have a valve activated by a lever which a server manually operates to fill a glass or a pitcher with the beverage. Such manual operation requires the server to monitor the flow of beverage from the tap once the valve is opened so that the container is properly filled but does not overflow in the event of excessive foaming of the dispensed beverage. However should the server be distracted and not shut off the tap at the proper time, the beverage may overflow the container.

In many establishments which serve beverages, it is desirable to track the quantity of beverage that is dispensed in order to monitor product slippage. For example, the quantity of beverage served at a sports venue is monitored by counting the number of disposable containers that are filled. Although servers are instructed to not refill containers for customers, a server may do so and not collect money from a friend or pocket the money paid by the customer. This beverage theft may go undetected, since a previously counted container was used.

Some establishments have automatic beverage dispensers in which the server merely pushes a button and the proper amount of beverage is dispensed automatically into the container. The beverages commonly are sold in a number of different sized beverage containers and the dispenser has a corresponding number of buttons with each one associated with a particular size container. A computer, which controls the dispensing, counts the number of times each button is pressed to dispense the beverage and thus determine the number of each size container that should have been used. The dispenser counts are reconciled with manual counts of the containers used or reconciled with manual counts of the containers used or with counts of each beverage size maintained by a cash register.

In addition, because the beverage is dispensed from the tap at a constant flow rate, the computer is able to determine the quantity of beverage that has been served by measuring the time of each dispensing operation for each size container. Thus, a determination can be made whether a significantly greater quantity of beverage has been dispensed than would be indicated by the container count.

One of the disadvantages of a completely automatic system is that the beverage may foam excessively and spill over the lip of the container. Therefore, it is desired to provide a manually controllable beverage tap that allows the server to interrupt the dispensing should excessive foaming occur, and yet have a device monitor the amount of beverage served to prevent theft and waste.

SUMMARY OF THE INVENTION

A general object of the present invention is to provide a manually operable beverage tap that can be monitored by a control circuit, such as a computer.

Another object is to provide a mechanism that disables the manually operable beverage tap after beverage has been dispensed into a serving container for a given period of time.

A further object of the present invention is to enable the control circuit to determine the given period of time based on the size of the serving container chosen to be filled.

Yet another object is to provide an electrically controlled clutch that disables the manually operated beverage tap in response to a control signal.

These objects are satisfied by a beverage dispenser that includes a body having a bore with an inlet, an outlet and a valve seat therebetween. A valve stem has a seal which selectively engages the valve seat to open and close the bore to a flow of beverage between the inlet and outlet. A serving lever is pivotally connected to the body. A clutch is alternately couples and decouples the serving lever to the valve stem depending upon whether an actuator connected to the clutch is energized. Only when the serving lever is coupled to the valve stem does movement of the serving lever cause movement of the valve stem which opens the bore. When the clutch decouples the serving lever and the valve stem, the flow of beverage is shut off by a spring forcing the seal against the valve seat. As a consequence a server may activate the beverage dispenser and fill a container only when the actuator is energized.

The beverage dispenser of this type is adapted to be connected to a control circuit that operates the actuator. Should the server leave the tap open for more than the nominal time required to fill a standard serving container, a timer in the control circuit lapses and de-activates the actuator. That action moves the clutch to release the coupling between the serving lever and the valve stem which causes closure of the beverage flow bore in the body.

DETAILED DESCRIPTION OF THE INVENTION

Figure 1:
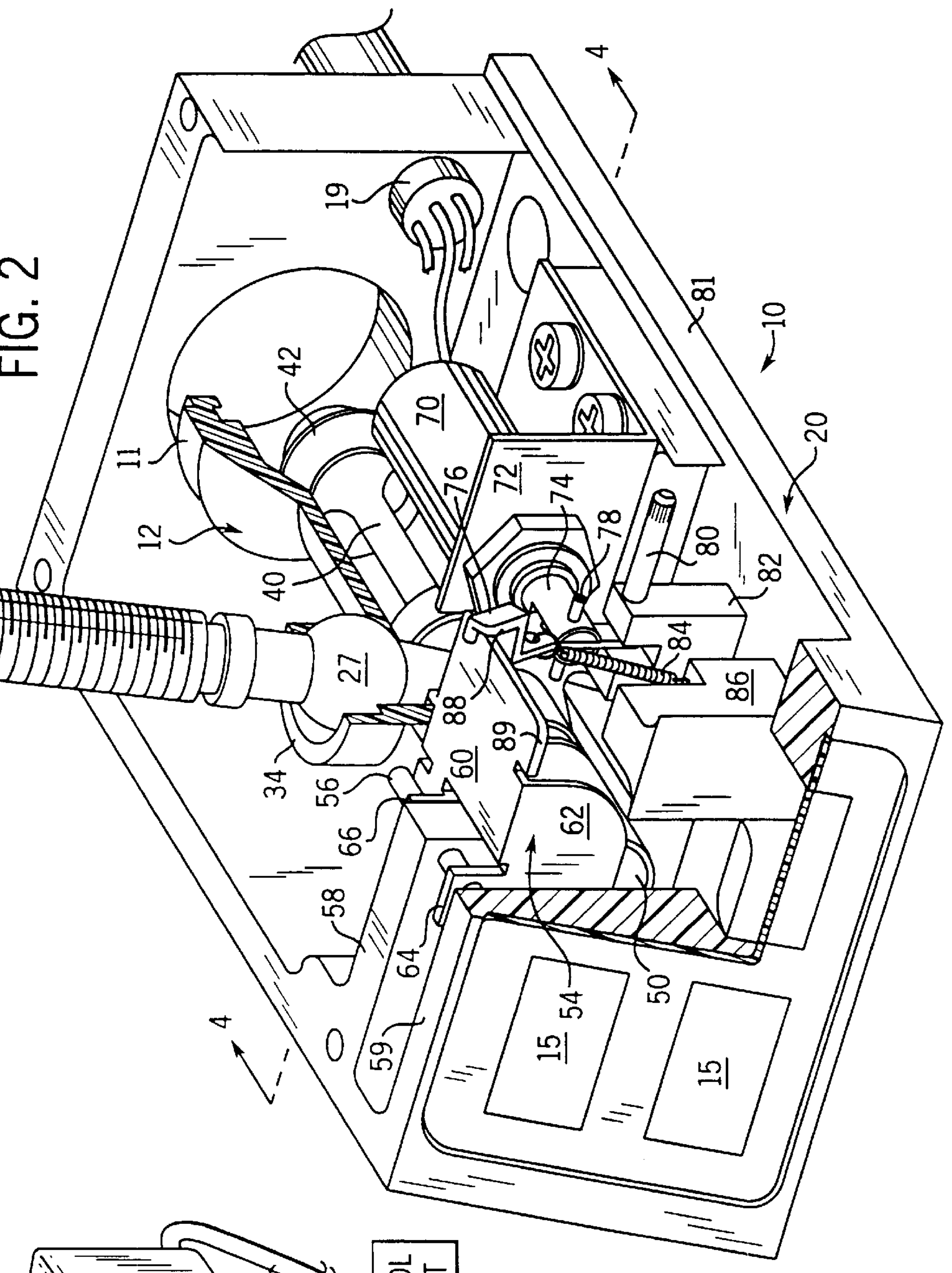
FIG. 1 is an isometric view of the beverage dispenser according to the present invention.
Figure 2:
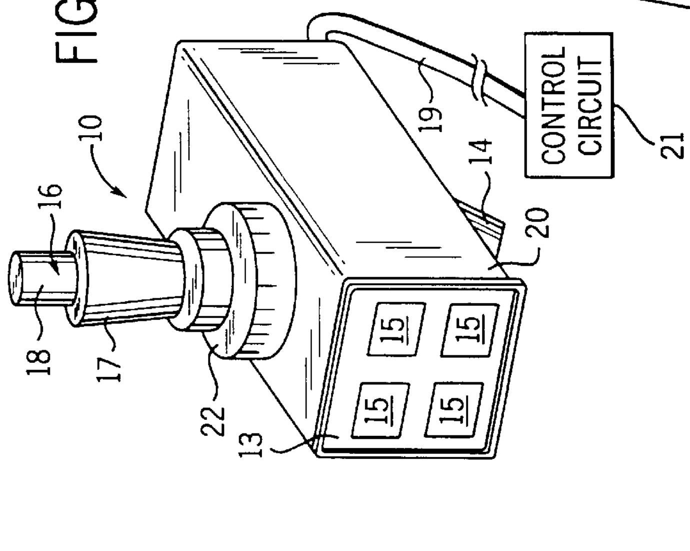
FIG. 2 is a partially cut-away view of the beverage dispenser with the cover removed.

With initial reference to FIGS. 1 and 2, a dispenser 10 for beverages, such as beer and carbonated soda, has a manual tap 12 with an inlet fitting 11 that is adapted to couple to a supply line through which beverage is conducted under pressure from a source, such as a keg. The tap 12 has a spout 14 from which the beverage is dispensed into a container when a server operates a serving lever 16 on top of the tap. A decorative handle jacket 17 is fastened around the exposed section of the serving lever 16 leaving an exposed threaded end 18 onto which a handle may be attached identifying the particular brand of beverage associated with the dispenser 10. A housing 20 encloses the tap 12 and is held in place by a threaded compression bonnet 22 that extends around serving lever 16.

The front surface of the dispenser housing 20 has a switch assembly 13 having four membrane type pushbutton switches 15. Each switch 15 corresponds to a different size beverage container that may be filled at the dispenser and the server presses the appropriate switch to commence beverage dispensing. A greater or lesser number of switches 15 may be provided depending upon the number of different sized beverage containers. The switches 15 are connected to conductors of a cable 19 which extends to a control circuit 21, such as a microprocessor based computer. The cable 19 has additional conductors connected to other components of the beverage dispenser 10, as will be described.

Figure 3:
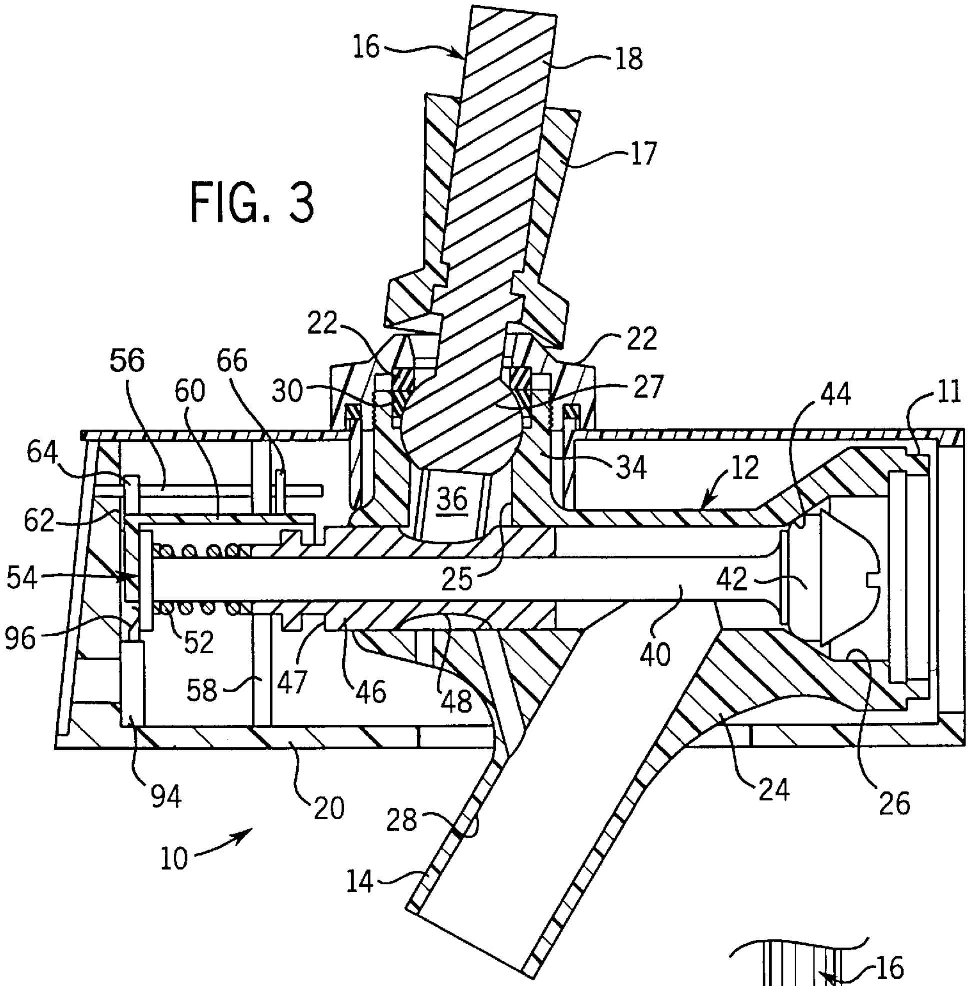
FIG. 3 is a cross-sectional view through the tap within the beverage dispenser.

The tap 12, shown in greater detail in FIG. 3, has a metal body 24 with a bore 26 extending horizontally through the body from the supply line fitting 11. The bore 26 communicates, through an outlet, with a passage 28 in the downwardly extending spout 14. The serving lever 16 extends through an opening 25 at the top of the tap body 24 and has a partially spherical section 27 that is received within a curved socket of that opening. Serving lever 16 is captivated in the socket by a friction ring 30 and a washer 32 that are compressed against partially spherical section 27 by the compression bonnet 22 which is threaded onto a tap collar 34 which projects upward around opening 25. The interior end of the serving lever 16 is forked into two tines 36.

The serving lever tines 36 extend on opposite sides of a tubular slide 46 located within the bore 26 and are received in an annular recess 48 of the slide, thereby enabling the serving lever to move the slide in both directions along the bore 36. A portion of the slide 46 projects from the tap bore 26 and has an annular groove 47. A valve stem 40 passes through a tubular slide 46 and has one end with a sealing ring 42 shown engaging a valve seat 44 in the bore 26 to close the tap 12 to the flow of beverage. The other end of the valve stem 40, at the front of the tap, projects from the exposed end of slide 46 and has a flange 50. A compression spring 52 is located on the valve stem 40 between the flange 50 and the slide 46, and biases the flange away from the slide 46.

With reference to FIGS. 2 and 3, a clutch mechanism includes a yoke 54 which is pivotally mounted on the housing 20 by a pin 56 that extends through an interior wall 58 and a front wall 59 of the housing. The yoke 54 has a top panel 60 which extends above the exposed front portions of the valve stem 40 and the slider 46. A vertical panel 62 of the yoke 54 projects downward from the top panel 60 in front of the valve stem flange 50 which abuts the vertical panel due to the bias force of spring 52. This vertical panel 62 has an upwardly extending tab 64 that projects between housing walls 58 and 59 with an aperture through which the pivot pin 56 extends. A similar tab 66 projects upward from the yoke 54 on the opposite side of interior wall 58 and also has an aperture through which the yoke pin 56 passes. In addition to pivoting about the pin 56, the yoke 54 is able to slide along the pin, as will be described.

Figure 4:
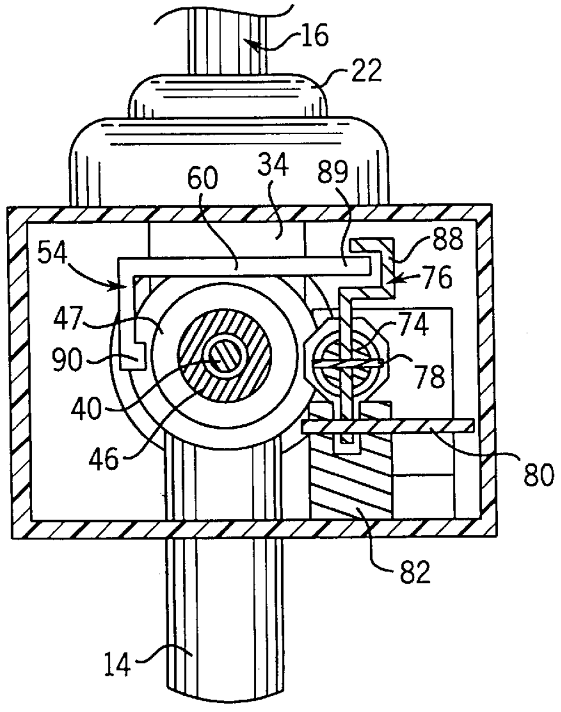
FIG. 4 is a cross-sectional view along line 4—4 of FIG. 2.

Referring to FIGS. 2 and 4, an edge 89 of the top panel 60 of the yoke 54 extends into an C-shaped end 88 of a yoke lever 76. The opposite end of the yoke lever 76 is pivotally connected by a pin 80 to a support 82 on the base 81 of the housing 20. An clutch actuator includes a solenoid 70, mounted on a bracket 72 attached to the housing base 81, with a horizontal armature 74 coupled to the yoke lever 76. Specifically, the exterior end of the solenoid armature 74 has a notch within which the yoke lever 76 is connected by a drive pin 78. The solenoid 70 is activated by an electrical signal received via cable 19 from the control circuit 21. Energizing and de-energizing the solenoid 70 moves the armature 74 in and out of the solenoid body causing the yoke lever 76 to pivot about pin 80. A tension spring 84 is connected between the yoke lever 76 and another support 86 on the base 81 of the housing 20.

As seen in FIG. 4, the yoke 54 has a tab 90 that is aligned vertically with the longitudinal axis of the valve stem 40 and spaced from the slider 46 when the solenoid 70 is de-energized. As will be described, when the solenoid 70 is energized, its armature 74 is pulled into the solenoid body pivoting the yoke lever 76 which pushing the edge 89 of the top plate 60 upward, resulting in the entire yoke 54 pivoting about pin 56 (FIG. 2). This action moves the yoke tab 90 closer toward the longitudinal axis of the slider 46 (FIG. 4) and into the annular groove 47 should that groove be aligned horizontally along the valve stem 40 with tab 90 (FIG. 3), as will be described in detail subsequently.

In order to dispense beverage, the serving lever 16 must be placed in the "off" position where the upper portion of the lever is tilted backward toward the supply fitting 11 at the rear of the tap 12. In this state illustrated in FIG. 3, the tines 36 at the interior end of the serving lever 16 push the slider 46 toward the front of the beverage dispenser 10. This action compresses the spring 52 between the slide 46 and the flange 50 at the end of the valve stem 40 which exerts force on the valve stem holding the sealing ring 42 against valve seat 44 thereby preventing beverage from flowing through the tap. In this state of the beverage dispenser 10, the tab 90 of the yoke 54, seen in FIG. 4, is aligned with the annular groove 47 around the slide 46.

With the dispenser 10 in this state, a server then depresses the pushbutton switch 15 which corresponds to the size of the serving container which has been placed beneath the spout 14 for filling. Pressing that switch 15 sends a signal via cable 19 to the control circuit 21 which responds by applying electric current to other conductors in the cable which are connected to the solenoid 70. This energizes the solenoid 70 producing an electromagnetic field which draws the armature 74 into the body of the solenoid, i.e., toward the rear of the dispenser housing as shown in FIG. 2. This action causes the yoke lever 76 to pivot backward about pin 80 and because the edge 89 of the yoke 54 is captivated within the C-shaped upper end of the yoke lever, the pivoting action pushes the top panel 60 of the yoke 54 upward causing the entire yoke to pivot about pin 56. The pivoting action of the yoke 54 moves the tab 90 on the opposite side of the slider 46 from the solenoid 70 into the annular groove 47 of the slider. The yoke is part of a clutch which when pivoted in this manner locks the slide 46 to the valve stem 40 so that the two latter components move together. Specifically, the tab 90 on the yoke is captivated within the annular groove 47 of the slider 46 and the front vertical panel 62 of the yoke abuts the flange 50 at the front end of the valve stem 40.

In this state of the beverage dispenser 10, the server is able to pull the upper end of the serving lever 16 forward pivoting the lever within the socket of tap collar 34. This action causes the tines 36 at the inner end of the serving lever 16 to push the slide 46 rearward within the tap bore 26 toward the supply fitting 11. The movement of the slider 46 transfers force through the yoke 54 to the flange 50 of the valve stem 40 which also causes the valve stem 40 to move through the bore 26 toward the supply fitting 11. Thus the sealing ring 42 on the valve stem 40 moves away from the valve seat 40 opening a passage for beverage to flow from the supply fitting 50 through spout 14 and into the serving container. As the slider 46 and valve stem 40 move in the bore, the yoke 54 slides with them along pivot pin 56.

Referring to FIG. 3, movement of the valve stem 40 also activates a switch 94 which has an arm 96 which is engaged by the valve stem flange 50 when the valve is in the closed state. Activation of the switch 94 sends an electrical signal to the control circuit 21 indicating that the tap valve within the beverage dispenser 10 now is open. The control circuit 21, which may be a microprocessor based computer, responds to this open signal by starting an internal timer which measures the period that the tap 12 is open. Should the server close the tap 12 by pushing the upper portion of the serving lever 16 rearward, the switch 94 will again be engaged by the flange 50 on the valve stem 40 signaling the closure of the tap to the control circuit 21. The control circuit 21 then responds by suspending the timer operation until the switch 94 once again indicates that the server has opened the tap 12. Thus the switch 94 acts as a sensor which detects whether the tap 12 is open or closed.

As noted previously, the control circuit 21 knows the size of the container being filled by detecting which one of the pushbutton switches 15 the server activated. For each of the four sizes of serving containers indicated by membrane switches 15 the control circuit 21 has stored in memory a maximum period that the tap should be open for that particular size container. In the event that the server allows the beverage to flow for a greater period of time, the control circuit 21 terminates activation of the solenoid 70 at the end of the corresponding maximum serving period.

De-energizing the solenoid 70 allows the tension spring 84 to pull the armature 74 and yoke lever 76 forward within the housing 20 as shown in FIG. 2. This movement of the yoke lever 76 pushes the edge 89 of the yoke 54 downward thereby moving the yoke tab 90 out of the annular groove 47 in the slide 46. As a result, the valve stem 40 is decoupled from the slide and the compression spring 52 pushes the flange 50 of the valve stem away from the slide 46 until the sealing ring 42 on the valve stem 40 engages the valve seat 44 closing the beverage dispenser to the flow of beverage. Thus the solenoid 70 of the actuator when activated by the control circuit 21 provides an automatic shut off for the beverage tap, in the event that the serving lever 16 is left in the open position for a prolonged time. Thereafter, in order to once again open the tap 12, the server must return the serving lever 16 into the closed position, i.e., move the upper portion of the handle rearward as shown in FIG. 3, so that the annular groove 47 in the slide 46 is aligned with the yoke tab 90.

We claim:

1. A beverage dispenser comprising:

a body having a bore with an inlet, an outlet and a valve seat therebetween;

a valve stem having a seal mounted thereon within the bore and selectively engaging the valve seat to open and close the bore to a flow of beverage between the inlet and outlet;

a serving lever pivotally connected to the body; and a clutch selectively couples and decouples the serving lever and the valve stem in response to an electrical signal, wherein only when the serving lever is coupled to the valve stem does movement of the serving lever cause movement of the valve stem which opens the bore.

2. The beverage dispenser as recited in claim 1 wherein the clutch comprises:

a linkage which is moveable between a first position in which the serving lever is coupled to the valve stem and a second position in which the serving lever is decoupled from the valve stem; and an actuator coupled to the linkage for moving the linkage between the first and second position in response to the actuator being energized.

3. The beverage dispenser as recited in claim 2 wherein the actuator comprises a electric solenoid with an armature coupled to the linkage.

4. The beverage dispenser as recited in claim 2 wherein the linkage comprises:

a tubular slide located in the bore being engaged by the serving lever, and having an aperture through which the valve stem extends; and a yoke having elements which engage both the tubular slide and the valve stem in the first position of the clutch and which do not engage at least one of the tubular slide and the valve stem in the second position of the clutch.

5. The beverage dispenser as recited in claim 4 wherein the actuator comprises an electric solenoid with an armature; a drive lever coupling the armature to the yoke; and a spring which biases the drive lever to urge the yoke into the second position.

6. The beverage dispenser as recited in claim 1 further comprising a spring which biases the valve stem to urge the seal against the valve seat when the clutch decouples the serving lever from the valve stem.

7. A beverage dispenser comprising:

a body having a bore with an inlet and an outlet and a valve seat therebetween;

a valve stem having a seal mounted thereon within the bore and selectively engaging the valve seat to open and close the bore to a flow of beverage between the inlet and outlet;

a slide in the bore and having an aperture through which the valve stem extends;

a first spring biasing the valve stem with respect to the slide wherein the valve stem is urged to move the seal against the valve seat;

a serving lever extending through an aperture in the body to engage the slide in the bore, and being pivotally connected to the body;

a yoke having elements which engage both the slide and the valve stem in the first position of the yoke and which do not engage at least one of the slide and the valve stem in the second position of the yoke; and an actuator coupled to the yoke for moving the yoke between the first and second position in response to the actuator being energized.

8. The beverage dispenser as recited in claim 7 wherein the actuator comprises a electric solenoid with an armature; a drive lever connecting the armature to the yoke; and a second spring which biases the drive lever to urge the yoke into the second position.

9. A beverage dispenser comprising:

a body having a bore with an inlet and an outlet and a valve seat therebetween;

a valve stem having a seal mounted thereon within the bore and selectively engaging the valve seat to open and close the bore to a flow of a beverage between the inlet and outlet;

a serving lever pivotally connected to the body;

a clutch selectively couples and decouples the serving lever and the valve stem in response to a control signal, wherein only when the serving lever is coupled to the valve stem does movement of the serving lever produce movement of the valve stem which opens the bore;

an activator that produces an electrical signal; and a control circuit connected to the actuator and responding to the electrical signal by and producing the control signal so that the clutch couples the serving lever and the valve stem for a given period of time.

10. The beverage dispenser as recited in claim 9 wherein the activator comprises an electric switch that is operated by a beverage server when beverage dispensing is desired.

11. The beverage dispenser as recited in claim 9 wherein the activator comprises an electric switch for operation by a beverage server when beverage dispensing is desired.

12. The beverage dispenser as recited in claim 9 wherein the activator comprises a plurality of electric switches with each one corresponding to a different size of beverage container that can be filled with a beverage server operating one of the plurality of electric switches when beverage dispensing is desired.

13. The beverage dispenser as recited in claim 12 wherein the control circuit determines the given period of time in response to which one of the plurality of electrical switches was operated by the beverage server.

14. The beverage dispenser as recited in claim 9 wherein the clutch couples the serving lever and the valve stem for the given period of time.

15. The beverage dispenser as recited in claim 9 further comprising a sensor that detects whether the bore is open and closed; and wherein the control circuit determines a length of the given period of time in response to the sensor.

16. The beverage dispenser as recited in claim 9 wherein the activator is a sensor that detects whether the bore is open and closed; and the control circuit determines a length of the given period of time in response to the sensor.

* * * * *